(12) United States Patent
Cage

(10) Patent No.: US 6,684,715 B1
(45) Date of Patent: Feb. 3, 2004

(54) CORIOLIS MASS FLOWMETER WITH IMPROVED ACCURACY AND SIMPLIFIED INSTRUMENTATION

(75) Inventor: Donald R. Cage, Longmont, CO (US)

(73) Assignee: FMC Technologies, Inc., Chicago, IL (US)

( * ) Notice: Subject to any disclaimer, the term of this patent is extended or adjusted under 35 U.S.C. 154(b) by 152 days.

(21) Appl. No.: 09/654,118

(22) Filed: Sep. 1, 2000

(51) Int. Cl.$^7$ .................................................. G01F 1/78
(52) U.S. Cl. .................................................. 73/861.357
(58) Field of Search ....................... 73/861.354–861.357

(56) References Cited

U.S. PATENT DOCUMENTS

| | | | |
|---|---|---|---|
| 3,927,565 A | | 12/1975 | Pavlin et al. |
| 5,576,500 A | | 11/1996 | Cage et al. |
| 5,628,630 A | * | 5/1997 | Misch et al. ............... 433/174 |
| 5,753,827 A | * | 5/1998 | Cage ....................... 73/861.354 |
| 5,814,739 A | * | 9/1998 | Van Cleve ............. 73/861.357 |
| 5,907,104 A | | 5/1999 | Cage et al. |

FOREIGN PATENT DOCUMENTS

| | | |
|---|---|---|
| JP | 63218822 | 9/1988 |
| JP | 07083718 | 3/1995 |
| JP | 09079882 | 3/1997 |

* cited by examiner

*Primary Examiner*—Edward Lefkowitz
*Assistant Examiner*—C Dickens
(74) *Attorney, Agent, or Firm*—Henry C. Query, Jr.

(57) ABSTRACT

The present invention is a Coriolis mass flowmeter which comprises at least one flowtube through which a fluid to be measured is allowed to flow; a number of force drivers for vibrating the flowtube in at least one mode of vibration of the flowtube; the vibration of the flowtube causing a driven deflection of the flowtube and the fluid flowing through the vibrating flowtube generating Coriolis forces which cause a Coriolis deflection of the flowtube; a plurality of strain-sensing transducers connected to the flowtube for generating signals representative of the driven deflection of the flowtube and the Coriolis deflection of the flowtube; and a signal processing circuit connected to the strain-sensing transducers for producing an indication of the mass flow rate of the fluid from the signals generated by the strain-sensing transducers.

21 Claims, 8 Drawing Sheets

US 6,684,715 B1

CORIOLIS MASS FLOWMETER WITH IMPROVED ACCURACY AND SIMPLIFIED INSTRUMENTATION

This application is based on U.S. Provisional Patent Application No. 60/152,396, which was filed on Sep. 3, 1999.

BACKGROUND OF THE INVENTION

The present invention relates to Coriolis-type mass flowmeters. More particularly, the invention relates to such a flowmeter which comprises at least one flowtube and a number of strain-sensing transducers for measuring the driven and Coriolis deflections of the flowtube.

Coriolis mass flowmeters typically comprise one or more geometrically precise flowtubes which are made of a strong yet resilient material such as stainless steel or titanium. The flowtube is mounted in a supporting structure having end connections, such as a casting or a pipe, to protect the flowtube and to provide for the attachment of the flowtube to external process piping. Coriolis flowmeters usually also comprise a number of force drivers for vibrating the flowtube in one of its modes of vibration, such as its first bending mode of vibration, and a plurality of motion sensors for measuring the vibratory deflections of the flowtube. The mass of the fluid passing through the vibrating flowtube generates Coriolis forces that act on the flowtube and cause it to deflect into a unique and characteristic shape, which is referred to herein as the "Coriolis deflection".

In many prior art Coriolis flowmeters, the motion sensors typically comprise two magnet/coil pairs: one located near the upstream end of the flowtube and the other located near the downstream end of the flowtube. Thus instrumented, the differences between the signals produced by the upstream and the downstream motion sensors as a result of the Coriolis deflection of the flowtube can be used to determine the mass flow rate of the fluid passing through the flowmeter, as is well known to those skilled in the art.

However, the use of magnet/coil pairs for the motion sensors is problematic for several reasons. First, the magnets and coils represent a significant mass loading on the flowtube which tends to alter the frequency response of the flowtube to the Coriolis forces. This is especially true if the flowmeter comprises two motion sensors which are displaced from each other along the length of the flowtube. Second, the Coriolis-induced deflection of the flowtube typically increases toward the ends of the flowtube, which is where the detrimental boundary condition effects typically occur. This creates a conflict between positioning the sensors close enough to the ends of the flowtube where the Coriolis induced deflections are large, yet far enough away from the ends to minimize any errors due to boundary condition effects. Third, individual magnet/coil pairs require significant care during assembly to achieve the necessary precision in positioning along the length of the flowtube, mass matching for accurate balance, and velocity output signal matching.

SUMMARY OF THE INVENTION

In accordance with the present invention, these and other disadvantages in the prior art are overcome by providing a Coriolis mass flowmeter which comprises at least one flowtube through which a fluid to be measured is allowed to flow and at least one force driver for vibrating the flowtube in at least one mode of vibration of the flowtube, such as its first bending mode of vibration. This vibration causes a driven deflection of the flowtube, and the fluid flowing through the vibrating flowtube generates Coriolis forces which cause a Coriolis deflection of the flowtube. Accordingly, the invention further comprises a plurality of strain-sensing transducers connected to the flowtube for generating signals representative of the driven deflection of the flowtube and the Coriolis deflection of the flowtube, and a signal processing circuit connected to the strain-sensing transducers for producing a measure of the flow rate of the fluid from the signals generated by the strain-sensing transducers.

Furthermore, it has been discovered that both the driven deflection and the Coriolis deflection of the flowtube may be sensed at a single location along the length of the flowtube, which is preferably near the mid-span centerline of the flowtube. Also, when subject to the driven deflection, for example when driven in either its first bending mode or first radial mode of vibration, the flowtube experiences a maximum displacement and consequently a local maximum normal strain, but little or no shear strain, near its mid-span centerline. Moreover, when subject to the Coriolis deflection, the flowtube experiences a local maximum shear strain, but little or no normal strain, near its mid-span centerline.

Therefore, the plurality of strain-sensing transducers preferably includes at least one normal strain-sensing transducer for detecting the normal strain on the flowtube resulting from the driven deflection of the flowtube, and at least one shear strain-sensing transducer for detecting the shear strain on the flowtube resulting from the Coriolis deflection of the flowtube. Moreover, both the normal strain-sensing transducer and the shear strain-sensing transducer are preferably mounted on the flowtube near its mid-span centerline. In addition, the normal and shear strain-sensing transducers optimally each comprise a simple, commercially available strain gage element. Furthermore, the strain gage elements of the normal and shear strain-sensing transducers are preferably mounted on a single substrate which is affixed to the flowtube to thereby simply the manufacture of the flowmeter.

Thus, it can be seen that the reliability and accuracy of the flowmeter of the present invention are improved by the use of motion sensors which comprise simple strain-sensing transducers. Since the present invention enables the use of only one set of sensors, rather than two magnet/coil pairs disposed along the length of the flowtube, the number of critical components in the flowmeter is accordingly reduced. This results in fewer components that can fail and also reduces the manufacturing cost of the flowmeter. Also, positioning the strain-sensing transducers near the mid-span centerline of the flowtube improves the accuracy of the flowmeter for several reasons. First, the reduced weight of the transducers minimizes the affect the sensors may have on the frequency response of the flowtube. Second, the mid-span sensing location is least affected by inaccuracies caused by boundary condition effects at the ends of the flowtube. Third, the strain gage-type sensors preferred for the present invention are highly linear and have high frequency response compared to magnet/coil pairs. Therefore, the Coriolis mass flowmeter of the present invention is generally more reliable than and capable of achieving much improved accuracy over prior art flowmeters.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

The present invention relates in general to all Coriolis-type mass flowmeters and in particular to single and dual-tube type Coriolis mass flowmeters operating in either a radial or a bending mode of vibration. The first embodiment of the invention will be described in connection with a single-tube flowmeter operating in a first order bending mode of vibration for its driven motion. Another embodiment of the invention will be described in connection with a single-tube flowmeter operating in a first order radial mode of vibration for its driven motion. However, it should be recognized that the present invention applies equally well to many different arrangements of Coriolis flowmeters, such as those having single or multiple flowtubes or flow surfaces with internal or external flow, and operating in any type of vibration mode, either natural or forced.

Figure 3A:
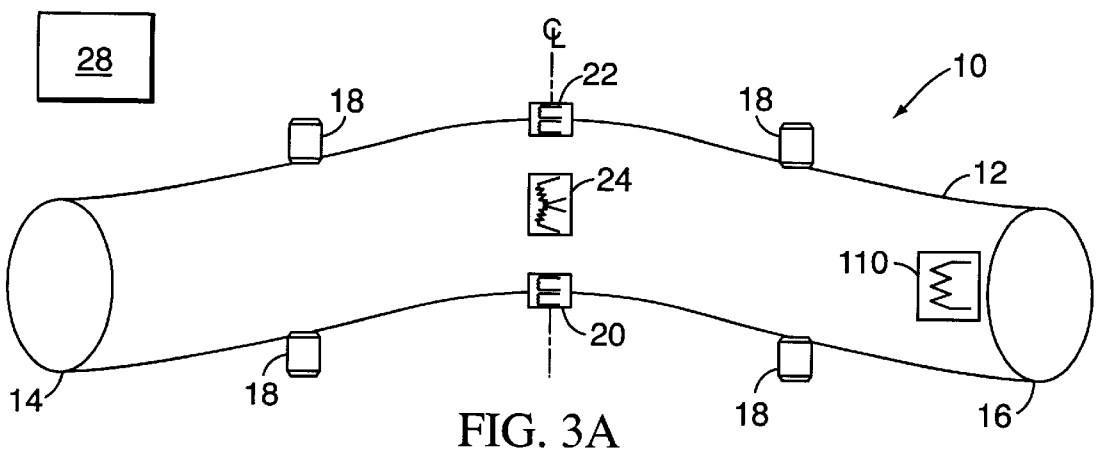
FIG. 3A is a side view depiction of a single-tube Coriolis mass flowmeter having a flowtube which is being vibrated in its first bending mode of vibration.

Referring first to FIG. 3A, a representative Coriolis mass flowmeter 10 which is constructed in accordance with the present invention is shown to comprises a single, straight flowtube 12 having first and second ends 14, 16 which are attached to suitable end connections (not shown), such as conventional pipe flanges. For purposes of the following discussion, the first and second ends 14, 16 are assumed to be rigidly held in place, for example by the external process piping (not shown) to which the end connections are secured. The flowtube 12 is preferably made of a resilient metallic material such as titanium or stainless steel. The flowmeter 10 also comprises a number of force drivers 18, such as conventional coil/magnet pairs, for generating controlled driving forces on the flowtube 12 as necessary to cause the flowtube to vibrate in one of its modes of vibration, as is well known in the art. Although the force drivers 18 are shown positioned along the longitudinal length of the flowtube 12, one or more force drivers may alternatively be positioned at the mid-span centerline CL of the flowtube.

Figure 3B:
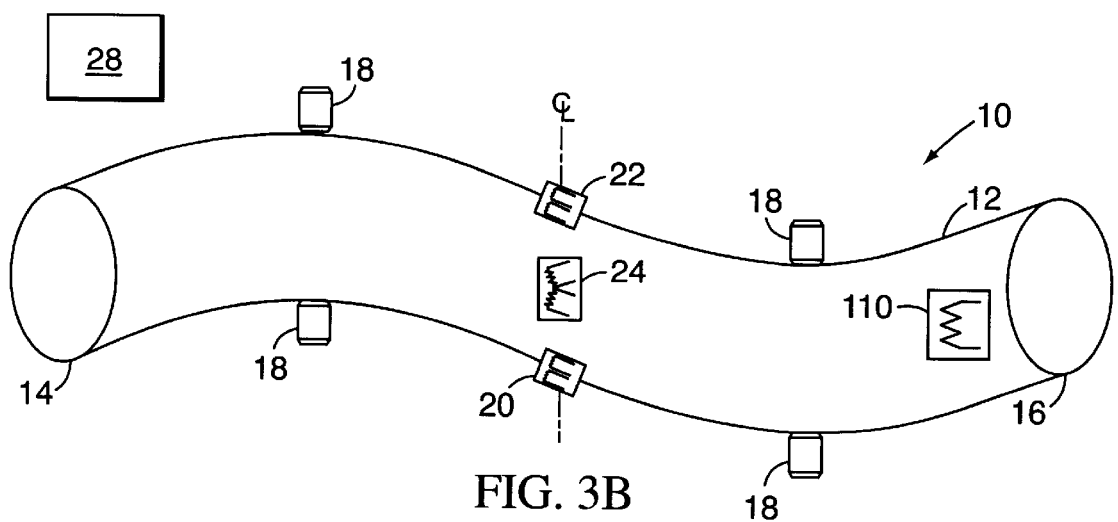
FIG. 3B is a depiction of the deflected shape of the flowtube of FIG. 3A resulting from Coriolis forces acting on the flowtube generated by a fluid passing through the flowtube.
Figure 3C:
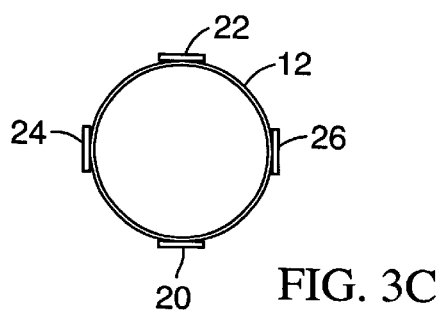
FIG. 3C is an end view of the flowtube of FIG. 3A showing the radial positioning of the strain-sensing transducer components of an embodiment of the present invention.

Referring also to FIG. 3C, in accordance with the present invention the flowmeter 10 also includes a number of strain-sensing transducers 20 through 26 fixedly attached to the flowtube 12, preferably near the mid-span centerline CL. The strain-sensing transducers preferably include a number of normal strain-sensing transducers 20, 22 for sensing normal strain along the length of the flowtube 12, and a number of shear strain-sensing transducers 24, 26 for sensing shear strain along the length of the flowtube. The preferred radial positioning of the strain-sensing transducers 20 through 26 is as shown in FIG. 3C, in which the normal strain-sensing transducers 20 and 22 are diametrically opposed along the bottom and top cords of the flowtube 12, respectively, and the shear strain-sensing transducers 24 and 26 are diametrically opposed along the left and right cords of the flowtube 12, respectively. This radial positioning and the orientation of the normal and shear strain-sensing transducers is governed by the desired driven mode of vibration and the resulting Coriolis deflections of the flowtube 12, and can be different for different designs of flowmeters, as will be made apparent below. Moreover, it should be understood that the flowmeter 10 could comprise a single normal strain-sensing transducer and a single shear strain-sensing transducer instead of two of each such transducers; however, employing four transducers allows for the use of a bridge circuit, as will be explained hereafter.

By appropriate excitation of the force drivers 18, the flowtube 12 is caused to vibrate in preferably its first bending mode of vibration, as shown in exaggerated form in FIG. 3A. This driven deflection of the flowtube 12 will cause the flowtube to experience cyclic strain along its length that can be sensed by the strain-sensing transducers 20 and 22. In addition, the Coriolis deflection of the flowtube will cause the flowtube to experience cyclic strain along its length that can be sensed by the strain-sensing transducers 24 and 26. The strain-sensing transducers 20 through 26 accordingly generate signals which are conveyed to a conventional signal processing circuit 28, where they are processed in a manner well known in the art to yield a measurement of the mass flow rate of the fluid flowing though the flowtube 12, as will be explained more fully below.

The relationship between the driven deflection of the flowtube 12 in its first bending mode of vibration and the resulting normal and shear strains induced on the flowtube can be explained by reference to FIGS. 1A through 1D. Referring to FIG. 1A, the driven deflection of the top cord of the flowtube 12 is represented by the curve 30, which one may observe is similar to the deflected shape of the flowtube as shown in FIG. 3A. So deflected, the flowtube 12 will experience normal strain on the top cord according to the curve 34 of FIG. 1C. Similarly, the flowtube 12 will also experience shear strain on its right cord along its length according to curve 36 of FIG. 1D. The deflection of the flowtube 12 as depicted by curve 30 of FIG. 1A, along with its resulting normal and shear strain curves 34 and 36 of FIGS. 1C and 1D, respectively, can be analyzed and understood according to traditional beam bending theory, as will now be described.

In chapter 11 of E. P. Popov, "Introduction to Mechanics of Solids" (Prentice Hall 1968), the mathematical relationships between (a) deflection, (b) slope, (c) moment, (d) shear, and (e) load along a uniform beam having an modulus of elasticity "E" and an area moment of inertia "I" are derived. The derivation shows that each successive parameter (a) through (e) is a derivative function of the preceding parameter, as shown on page 385 of the text and in equations 1 through 4 below. Accordingly, curve 30 of FIG. 1A, which depicts the deflection of flowtube 12, can be related to equation 1 below as the deflection of a beam. Continuing with this analysis, the slope of the deflection curve 30 would be the $1^{st}$ derivative of curve 30, which is represented by equation 2 below and shown as curve 32 in FIG. 1B. The moment and the associated normal strain on the flowtube 12, which are proportionately related (see Popov, page 381), would be the $2^{nd}$ derivative of curve 30, which is represented by equation 3 below and shown as curve 34 in FIG. 1C. Similarly, the shear and the associated shear strain on the flowtube 12 would be the $3^{rd}$ derivative of curve 30, which is represented by equation 4 below and shown as curve 36 of FIG. 1D.

$$v = \text{deflection} \quad [1]$$

$$\theta(\text{slope}) = \frac{dv}{dx} = v' \quad [2]$$

$$M(\text{moment \& normal strain}) = EI\frac{d^2v}{dx^2} = EIv'' \quad [3]$$

$$V(\text{shear \& shear strain}) = \frac{dM}{dx} = -EIv''' \quad [4]$$

Figure 1B:
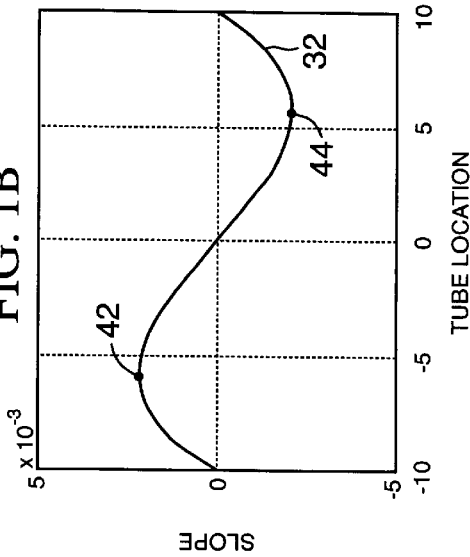
FIG. 1B is a graph representing the slope of the curve depicted in FIG. 1A.
Figure 1D:
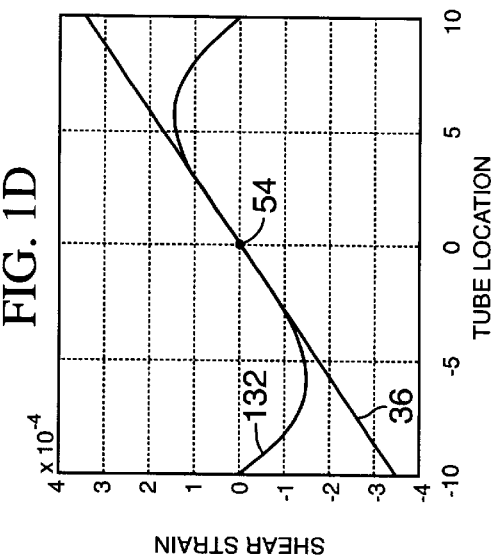
FIG. 1D is a graph representing the shear strain along the top cord of the flowtube resulting from the deflected shape of FIG. 1A.
Figure 1A:
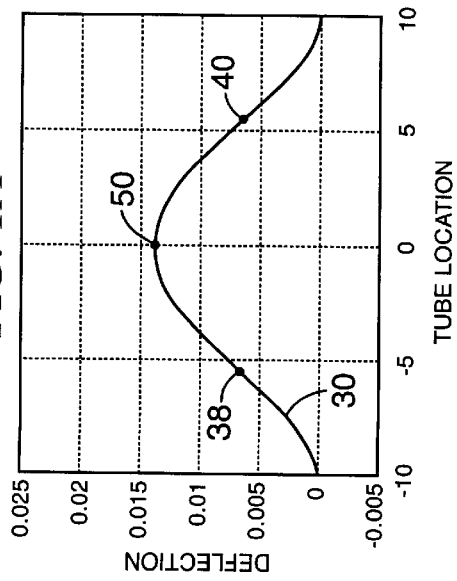
FIG. 1A is a graph representing the driven deflection of the top cord of an exemplary flowtube with fixed-fixed end conditions vibrating in its first bending or first radial mode of vibration, the magnitude of the deflection being exaggerated for purposes of clarity.

As a result of this succession of derivatives defining the relationships between curves 30, 32, 34 and 36 of FIGS. 1A, 1B, 1C and 1D, respectively, some important observations can be made. First, curve 30 of FIG. 1A, which represents the driven deflection of the flowtube 12, has two inflection points 38 and 40 where the slope of the deflection curve is maximum and the rate of change of the slope is near zero. These points 38 and 40 correspond both to points 42 and 44 on curve 32 of FIG. 1B, which represent the maximum slope values, and to points 46 and 48 on curve 34 of FIG. 1C, which represent near zero moment and normal strain values. More importantly, at the mid-span centerline of the flowtube 12 the deflection curve 30 of FIG. 1A has an amplitude maximum at point 50, and the associated normal strain curve 34 of FIG. 1C has a local maximum value at the corresponding point 52. Additionally, the shear strain at the corresponding point 54 on curve 36 of FIG. 1D is shown to be near zero. Therefore, the normal strain-sensing transducers 20 and 22, being located near the mid-span centerline CL of flowtube 12, are well positioned to measure a local maximum value of normal strain resulting from the driven deflection of the flowtube (point 52 on curve 34 of FIG. 1C). Moreover, the shear strain-sensing transducers 24 and 26, also being located near the mid-span centerline CL of flowtube 12, would here measure a near zero value of shear strain resulting from the driven deflection of the flowtube (point 54 on curve 36 of FIG. 1D).

Figure 2A:
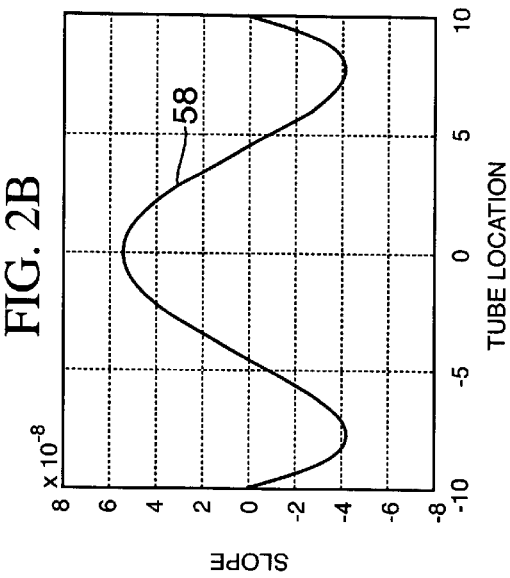
FIG. 2A is a graph representing the Coriolis deflection along the top cord of an exemplary flowtube with fixed-fixed end conditions resulting from Coriolis forces acting on the flowtube generated by a fluid passing through the flowtube, the magnitude of the deflection being exaggerated for purposes of clarity.
Figure 2B:
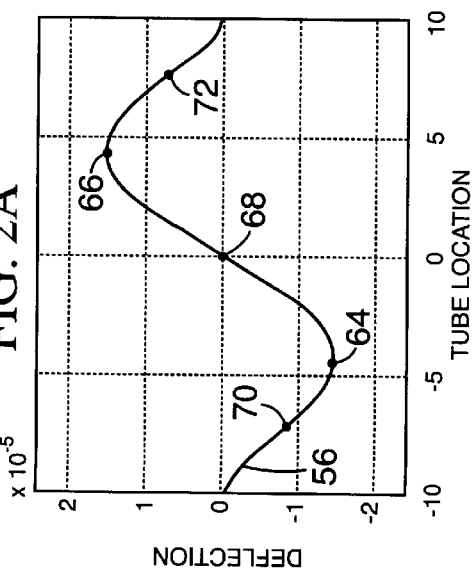
FIG. 2B is a graph representing the slope of the curve depicted in FIG. 2A.
Figure 2C:
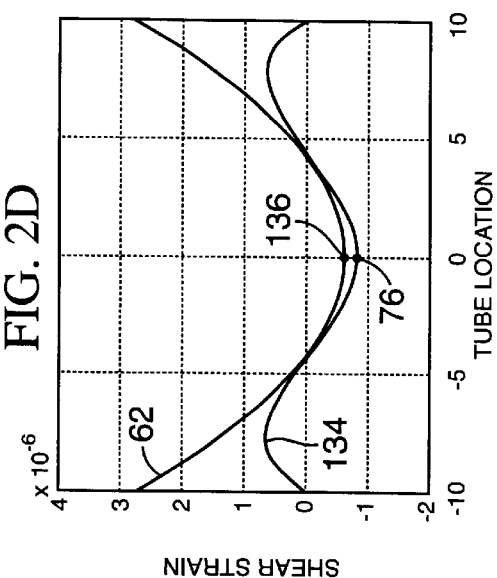
FIG. 2C is a graph representing the normal strain along the top cord of the flowtube resulting from the Coriolis-deflected shape of FIG. 2A.
Figure 2D:
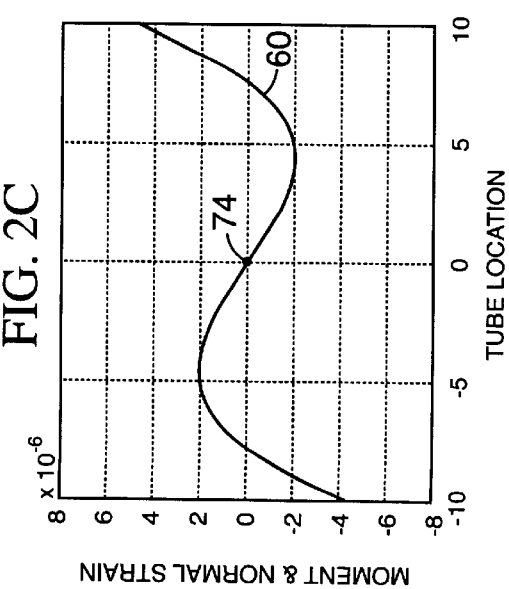
FIG. 2D is a graph representing the shear strain along the top cord of the flowtube resulting from the Coriolis-deflected shape of FIG. 2A.

Analogous to the preceding discussion, FIG. 3B depicts the deflected shape of the flowtube 12 resulting from the Coriolis forces acting on the flowtube which are generated by the fluid passing through the vibrating flowtube. The relationship between this Coriolis deflection of the flowtube 12 and the resulting normal and shear strains created on the flowtube is illustrated in FIGS. 2A through 2D. Curve 56 of FIG. 2A represents the Coriolis deflection of the top cord of the flowtube 12, which corresponds to equation 1 above. Curve 58 of FIG. 2B represents the resulting Coriolis induced slope as the $1^{st}$ derivative of the deflection curve 56, which corresponds to equation 2 above. Curve 60 of FIG. 2C represents the resulting Coriolis induced moment and normal strain on the flowtube 12 as the $2^{nd}$ derivative of the deflection curve 56, which corresponds to equation 3 above. Finally, curve 62 of FIG. 2D represents the resulting Coriolis induced shear strain on the flowtube 12 as the $3^{rd}$ derivative of the deflection curve 56, which corresponds to equation 4 above.

Visual inspection of the Coriolis deflection curve 56 of FIG. 2A shows that this curve differs from the driven deflection curve 30 of FIG. 1A by having a "higher order" deflection shape with two local deflection maximum points 64 and 66 and three inflection points 68, 70, and 72, whereas the driven deflection curve 30 of FIG. 1A has only one deflection maximum point 50 and two inflection points 38 and 40. Most important to the understanding of the present invention is the observation that the normal strain at the mid-span centerline CL of the flowtube 12 due to the Coriolis deflection of the flowtube (point 74 on curve 60 of FIG. 2C) is near zero while the corresponding shear strain (point 76 on curve 62 of FIG. 2D) is a local maximum. Therefore, the shear strain-sensing transducers 24 and 26, being located at the mid-span centerline CL of the flowtube 12, are well positioned to measure this local maximum value of shear strain. Moreover, the normal strain-sensing transducers 20 and 22, also being located at the mid-span centerline CL of the flowtube 12, will measure a near zero value of normal strain resulting from the Coriolis deflection of the flowtube.

Therefore, by using the signals from the normal strain-sensing transducers 20 and 22 to measure the driven deflection of the flowtube 12 and the signals from the shear strain-sensing transducers 24 and 26 to measure the Coriolis deflection of flowtube 12, the signal processing circuit 28 can derive a result proportionately related to the mass flow rate of the fluid passing through the flowtube 12. In this manner, both measurements may be made at the same location along the length of flowtube 12.

Figure 5:
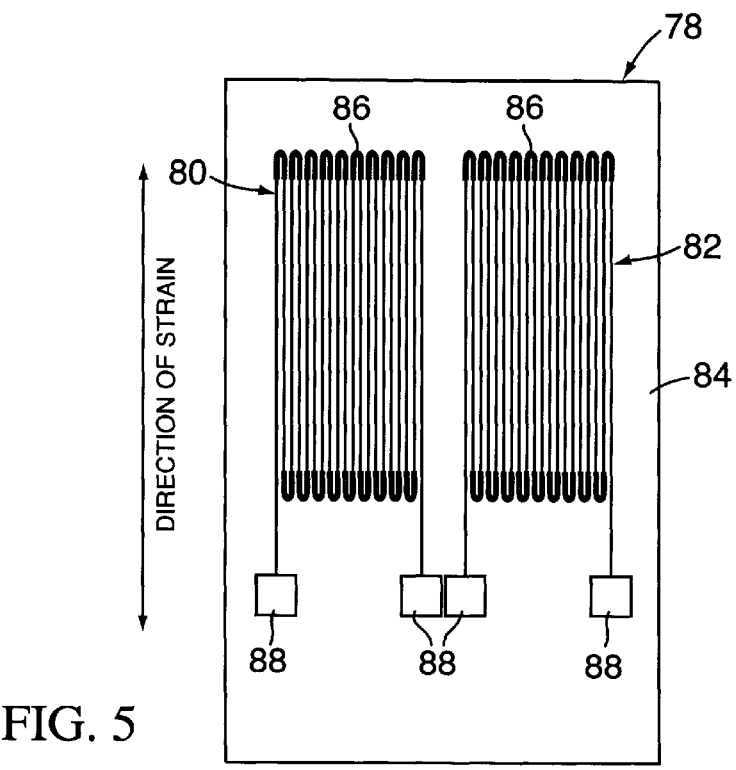
FIG. 5 is a representative view of a typical dual element normal strain-sensing transducer which is suitable for use in the present invention.

Referring now to FIG. 5, a dual element strain-sensing transducer 78 which is suitable for use as a normal strain-sensing transducer 20, 22 is shown to comprise two strain sensing elements 80 and 82 which are mounted on a substrate 84. The sensing elements 80, 82 may be simple strain gage elements. Accordingly, the sensing elements 80, 82 are arranged as thin, parallel wires which ideally have thicker return connections 86 and enlarged contacts 88. Furthermore, the sensing elements 80, 82 are preferably made of a chromium-nickel alloy, such as "Karma". A commercial example of a transducer 78 is the model #WK-XX-250PD-350 transducer from Vishay Measurements Group of Raleigh, N.C.

Figure 7:
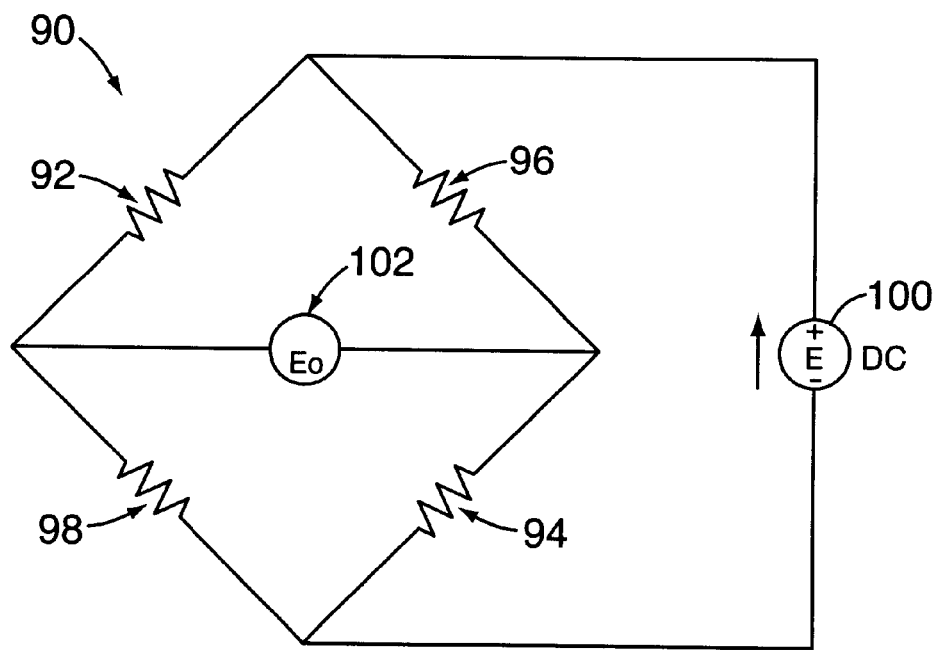
FIG. 7 is a representative view of a typical strain-sensing transducer four leg active bridge electrical circuit which is suitable for use in the present invention.

Having two sensing elements 80, 82 electrically and physically mounted on one substrate 84 facilitates the use of a measurement configuration that comprises a full four leg active bridge circuit 90, which is shown in FIG. 7. In the preferred embodiment of the invention, the normal strain sensing transducer 20 comprises a dual element transducer 78, with the elements 80 and 82 connected into the bridge circuit 90 at positions 92 and 94, respectively. Similarly, the normal strain-sensing transducer 22 comprises a dual element transducer 78, with the elements 80 and 82 connected into the bridge circuit 90 at positions 96 and 98, respectively. Since the two strain sensing elements 80, 82 on transducer 20 sense essentially the same magnitude of strain (for example tensile strain), while the two strain sensing elements 80, 82 on transducer 22 sense essentially the same magnitude of strain but opposite in sign to that sensed by transducer 20 (for example compressive strain), the change in resistance due to the strain on each adjacent leg of the bridge circuit 90 is essentially equal and opposite, thereby creating a full four leg active bridge circuit. The bridge circuit 90 is electrically excited by a voltage or current source 100 and the resulting normal strain signal is derived across the bridge 102, as is well known in the art.

Figure 6:
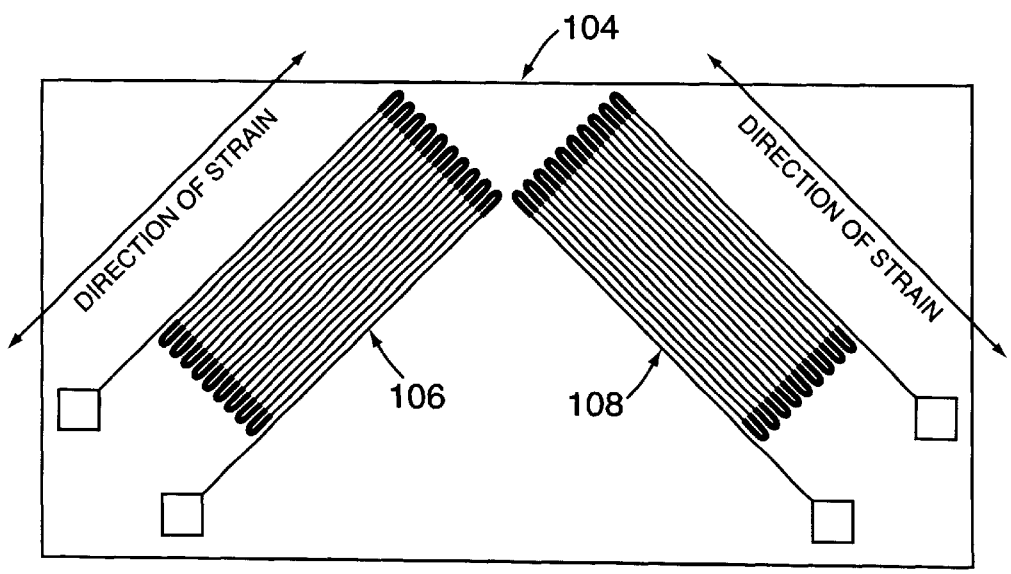
FIG. 6 is a representative view of a typical dual element shear strain-sensing transducer which is suitable for use in the present invention.

Referring to FIG. 6, a dual element strain-sensing transducer 104 which is suitable for use as a shear strain-sensing transducer 24, 26 is shown to comprise two strain sensing elements 106 and 108 which are mounted on a substrate similar to substrate 84. The sensing elements 106, 108 are similar to the sensing elements 80, 82; however, the sensing elements 106, 108 are arranged with their active directions offset 90° so that the shear strain will cause tensile strain in one element (for example element 106) and compressive strain in the other element (for example element 108).

The shear strain-sensing transducers 24, 26 are preferably employed in a full four leg active bridge circuit similar to bridge circuit 90. Thus, the shear strain transducer 24 preferably comprises a dual element transducer 104, with the sensing elements 106 and 108 connected into the bridge circuit at positions 92 and 98, respectively. Similarly, the shear strain transducer 26 preferably comprises a dual element transducer 104 with the sensing elements 106 and 108 connected into the bridge circuit at positions 96 and 94, respectively. The bridge circuit so arranged is electrically excited by a voltage or current source similar to source 100, and the resulting shear strain signal is derived across a bridge similar to bridge 102 in FIG. 7.

While the use of full four leg active bridge circuits for the normal and shear strain sensing transducers in the flowmeter 10 is preferred, many other circuit configurations can alternatively be employed to derive the normal strain and shear strain signals, including a single normal strain-sensing transducer and a single shear strain-sensing transducer. However, a four leg active bridge circuit has more sensitivity and less temperature dependence than a single transducer circuit, as is well known. In addition, some commercial strain gage devices have a gage factor or other sensitivity to temperature. If such a strain gage is employed in the present invention, the flowmeter 10 preferably also includes a temperature sensor 110 (FIGS. 3 and 4) to facilitate any required temperature compensation.

Figure 4A:
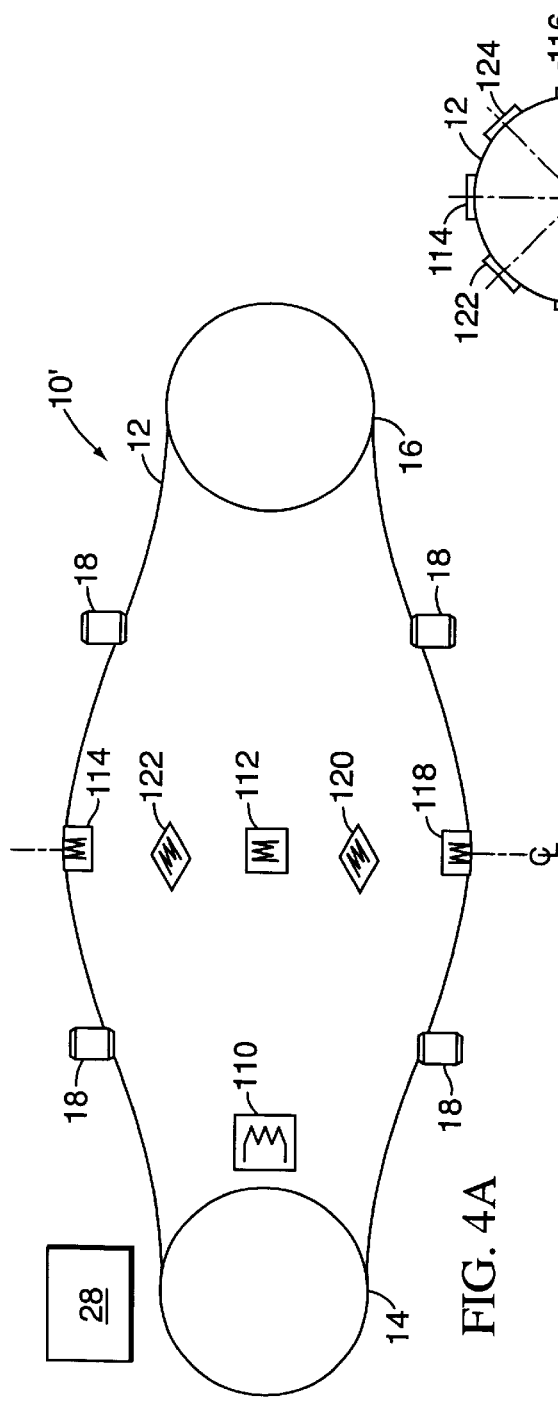
FIG. 4A is a side view depiction of a single-tube Coriolis mass flowmeter having a flowtube which is being vibrated in its first radial mode of vibration.
Figure 4B:
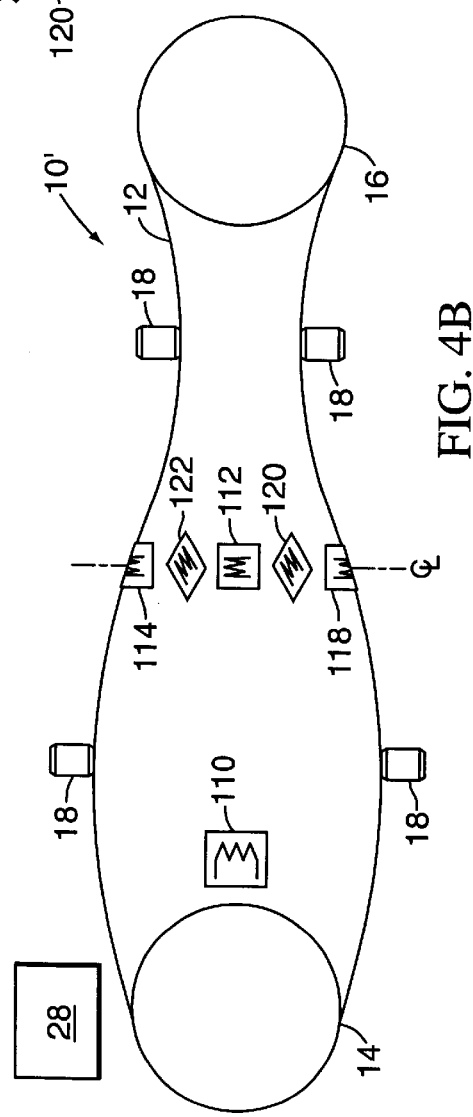
FIG. 4B is a depiction of the deflected shape of the flowtube of FIG. 4A resulting from Coriolis forces acting on the flowtube generated by a fluid passing through the flowtube.
Figure 4C:
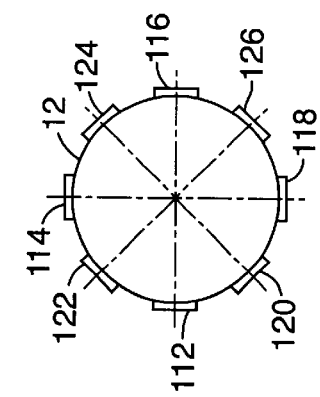
FIG. 4C is an end view of the flowtube of FIG. 4A showing the radial positioning of the strain-sensing transducer components of an embodiment of the present invention.
Figure 8:
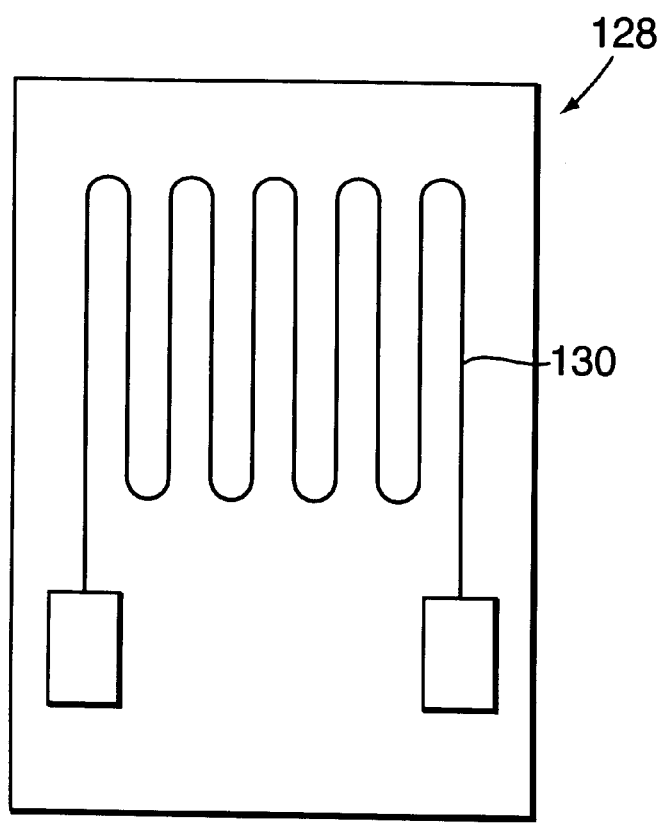
FIG. 8 is a representative view of a typical single element strain-sensing transducer which is suitable for use in the present invention.

An alternative Coriolis mass flow meter wherein the flowtube is vibrated in a radial mode rather than a bending mode is shown in FIGS. 4A through 4C. The Coriolis mass flowmeter of this embodiment, which is indicated generally by reference number 10', is shown to comprise a flowtube 12 being driven by force drivers 18 to vibrate in its $1^{st}$ radial mode of vibration, which is depicted in exaggerated form in FIG. 4A. In this embodiment, the flowmeter 10' comprises preferably four normal strain-sensing transducers 112 through 118 and preferably four shear strain-sensing transducers 120 through 126. The strain-sensing transducers 112 through 126 are each preferably similar to the strain sensing transducer 128 shown in FIG. 8, which includes a single strain sensing element 130, such as a simple strain gage.

The preferred radial positioning of the strain-sensing transducers 112 through 126 is shown in FIG. 4C. The normal strain-sensing transducers 112 through 118 are positioned near the mid-span centerline CL of the flowtube 12 and are located radially around the circumference of the flowtube along the cords at 0°, 90°, 180° and 270°, which correspond to the maximum deflection points during driven vibration of the flowtube. The shear strain-sensing transducers 120 through 126 are positioned near the mid-span centerline CL of the flowtube 12 and are located radially around the circumference of flowtube along the cords at 45°, 135°, 225° and 315°, which correspond to the "translational nodes" between the just described maximum deflection points. The orientation of the normal strain-sensing transducers 112 through 118 can either be in the circumferential direction or the longitudinal direction of the flowtube 12 since the normal strain from the driven deflection of the flowtube has measurable components in both directions at the mid-span centerline CL. In the preferred embodiment, however, the orientation of the normal strain-sensing transducers is circumferential direction. The orientation of the shear strain-sensing transducers 120 through 126 should be between the longitudinal and the circumferential directions, and is preferably 45° between these directions to effectively measure any shear type strain field occurring at the locations of the shear strain-sensing transducers.

Further, having four normal strain-sensing transducers and four shear strain-sensing transducers positioned and oriented as just described facilitates the use of normal and shear strain measurement configurations which comprise full four leg active bridge circuits. During the driven deflection of the flowtube 12, the normal strain-sensing transducers 112 and 116 will experience normal strain of one sign, such as tensile strain, while the normal strain-sensing transducers 114 and 118 will experience normal strain of the opposite sign, such as compressive strain. By connecting these sensors in a bridge circuit so that each leg of the bridge senses normal strain of a sign opposite that sensed by each adjacent leg, a full four leg active bridge circuit similar to the bridge circuit 90 of FIG. 7 may be created. Similarly, during Coriolis deflection of the flowtube 12, which is illustrated in exaggerated form in FIG. 4B, the shear strain-sensing transducers 120 and 124 will experience shear strain of one sign, such as tensile strain, while the shear strain-sensing transducers 122 and 126 will experience shear strain of the opposite sign, such as compressive strain. By connecting these sensors in a bridge circuit so that each leg of the bridge senses shear strain of a sign opposite that sensed by each adjacent leg, a full four leg active bridge circuit similar to the bridge circuit 90 of FIG. 7 may again be created. While the use of a full four leg active bridge circuit is not necessary in the present invention, it is preferred since this circuit arrangement minimizes temperature sensitivities.

During operation of the flowmeter 10' in the $1^{st}$ radial mode of vibration, the driven deflection of the top cord of the flowtube 12 as shown in FIG. 4A can be represented both by curve 30 of FIG. 1A and equation 1 above. The slope of the driven deflection can again be represented both by curve 32 of FIG. 1B and equation 2 above. Similarly, the normal strain on the flowtube 12 from the driven deflection can be represented both by curve 34 of FIG. 1C and equation 3 above. Finally, the shear strain on the flowtube 12 from the driven deflection is represented by curve 132 of FIG. 1D, which is slightly different than the earlier-described curve 36 for the $1^{st}$ bending mode embodiment of flowmeter 10. This difference is due to the fact that the radial mode vibrations have deflections every 90° around the circumference of the flowtube 12, rather than just at the top and bottom cords of the flowtube as in the $1^{st}$ bending mode. These higher order deflections add additional complexity near the ends of curve 132. However, near the longitudinal middle of the flowtube 12 the curves 36 and 132 are similar, and at the mid-span centerline CL of the flowtube the two curves both have a zero or near zero value for the shear strain at point 54.

Analogously, the Coriolis deflection of the top cord of the flowtube 12, which is depicted in FIG. 4B, can be represented both by curve 56 of FIG. 2A and equation 1 above. Also, the slope of the Coriolis deflection can again be represented both by curve 58 of FIG. 2B and equation 2 above. Similarly, the normal strain on the flowtube 12 from the Coriolis deflection can be represented both by curve 60 of FIG. 2C and equation 3 above. Finally, the shear strain on the flowtube 12 from the Coriolis deflection is here represented by curve 134 of FIG. 2D, which again has more complexity toward its ends than the associated curve 62; however at the mid-span centerline CL both curves 62 and 134 have local maximums at points 76 and 136, respectively.

Figure 1C:
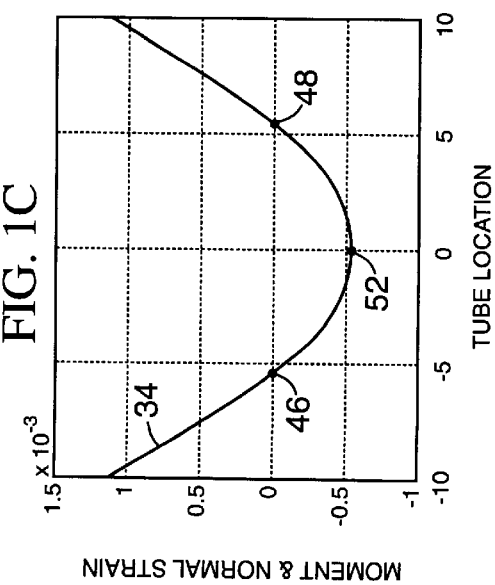
FIG. 1C is a graph representing the normal strain along the top cord of the flowtube resulting from the deflected shape of FIG. 1A.

Similar to the flowmeter 10 which used the $1^{st}$ bending mode of vibration, the normal strain sensing transducers 112 through 118 of the flowmeter 10', being located at the mid-span centerline CL of the flowtube 12, are well positioned to measure a local maximum value of normal strain resulting from the driven deflection of the flowtube (point 52 on curve 34 of FIG. 1C). Moreover, the shear strain sensing transducers 120 through 126 of the flowmeter 10', also being located at the mid-span centerline CL of the flowtube 12, would here measure a near zero value of shear strain resulting from the driven deflection of flowtube (point 54 on curve 132 of FIG. 1D). In addition, the normal strain sensing transducers 112 through 118, being located at the mid-span centerline CL of the Flowtube 12, are well positioned to measure a near zero value of normal strain resulting from the Coriolis deflection of the flowtube (point 74 on curve 60 of FIG. 2C). Furthermore, the shear strain sensing transducers 120 through 126, also being located at the mid-span centerline CL of the flowtube 12, would here measure a local maximum value of shear strain resulting from the Coriolis deflection of the flowtube (point 136 on curve 134 of FIG. 2D). As with the flowmeter 10, the flowmeter 10' also comprises a suitable signal processing circuit 28 for receiving the strain signals related to both the driven deflection of the flowtube 12 and the resulting Coriolis deflection of the flowtube, and for producing from these signals a result proportionately related to the mass flow rate of the fluid passing through flowtube.

Figure 9:
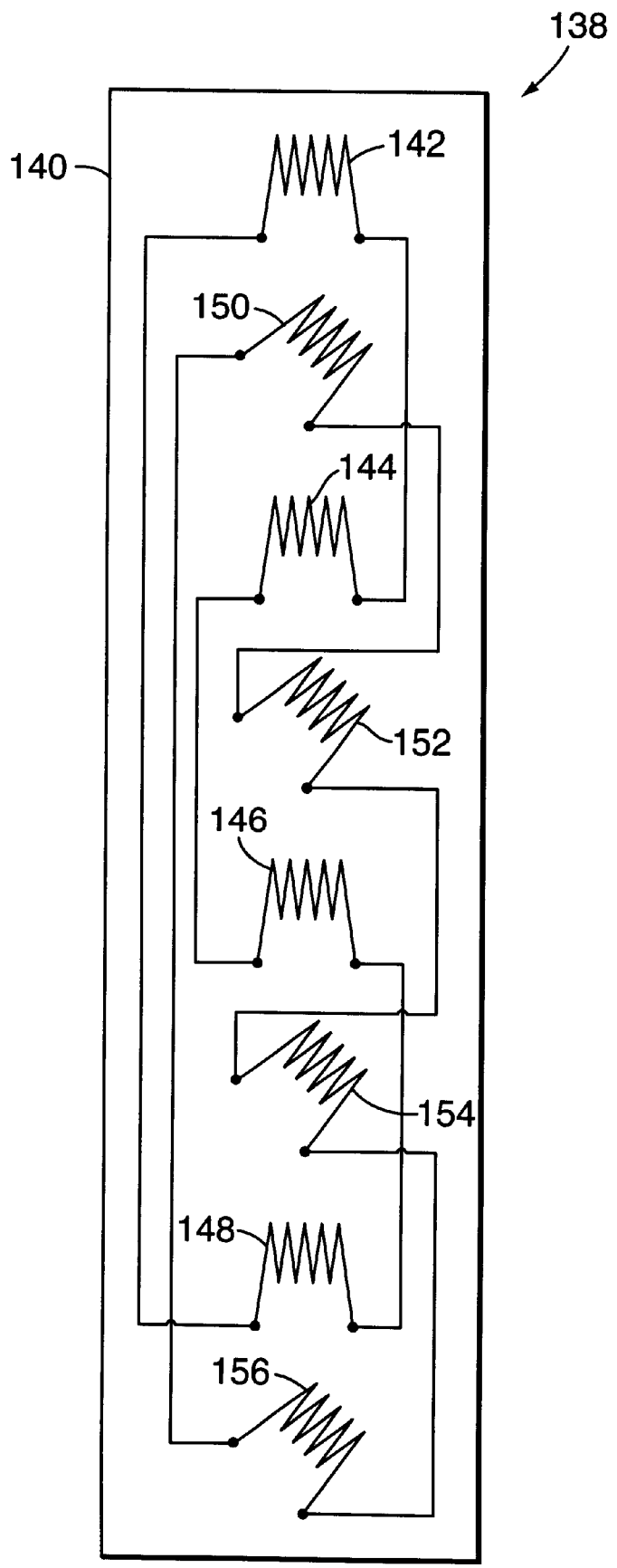
FIG. 9 is a representative view of a multi-element strain-sensing transducer assembly which is suitable for use in the present invention.
Figure 10:
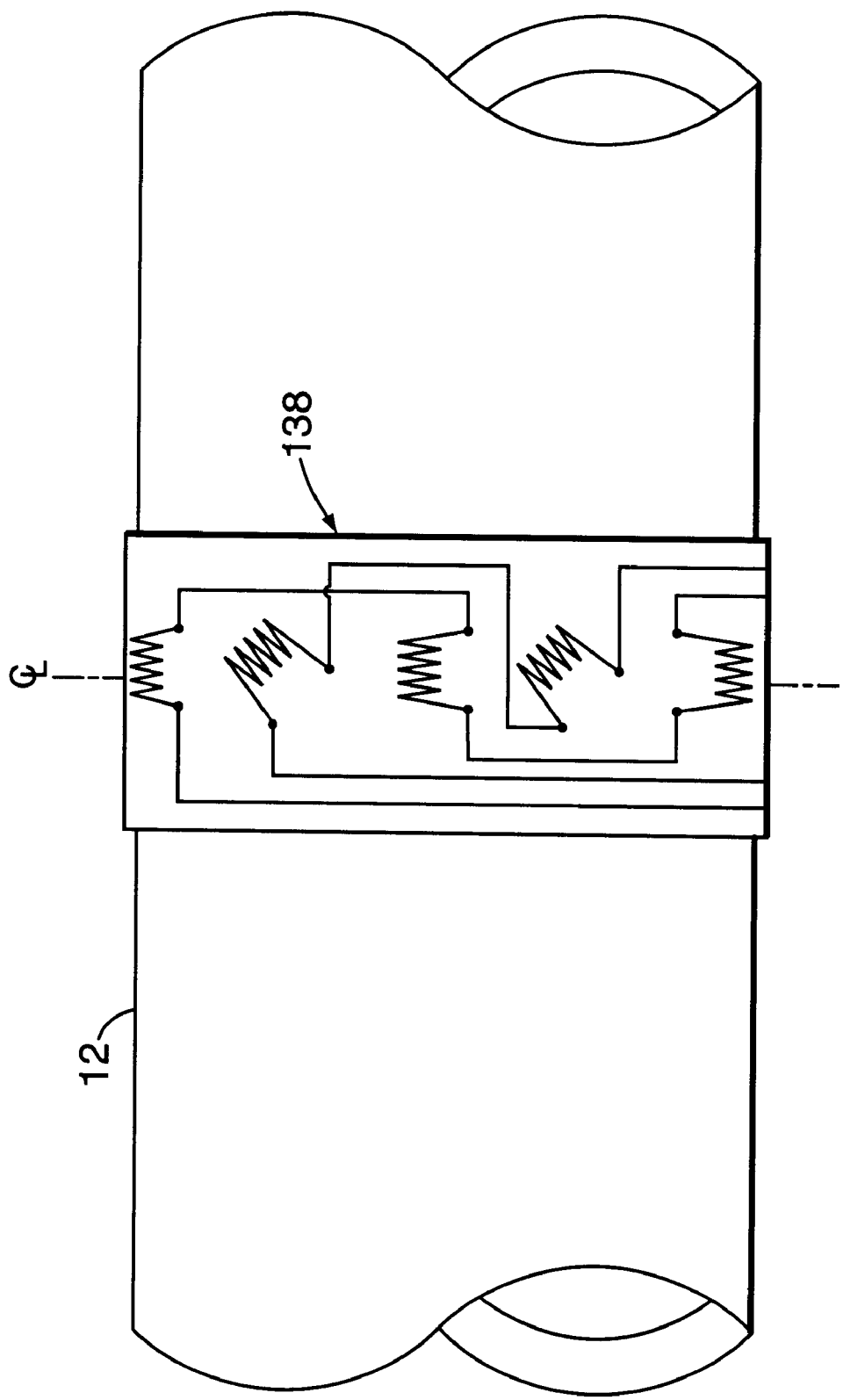
FIG. 10 is a representative view of the multi-element strain-sensing transducer assembly of FIG. 9 shown mounted on a flowtube component of one embodiment of a flowmeter according to the present invention.

As a further benefit of the present invention, since the driven and the Coriolis deflection measurements can be made at the same location along the length of the flowtube 12, the flowmeters 10 and 10' can be further simplified by mounting the strain-sensing transducers on a single substrate. An example of this type of transducer assembly is shown in FIG. 9. The transducer assembly, which is indicated generally by reference number 138, comprises a single substrate 140 which is preferably a standard strain gage backing material such as polyamid, epoxy-phenolic, or the like. To facilitate the use of four leg active bridge circuits, the transducer assembly 138 comprises preferably four normal strain-sensing transducers 142 through 148 which are arranged along the length of the substrate 140 so that, when it is wrapped around the circumference of the flowtube 12 as illustrated in FIG. 10, they will align with the radial positions described above for the normal strain-sensing transducers 112 through 118. The transducer assembly 138 also comprises preferably four shear strain-sensing transducers 150 through 156 which are arranged along the length of the substrate 140 so that, when it is wrapped around the flowtube 12, they will align with the radial positions described above for the shear strain-sensing transducers 120 through 126. The normal strain-sensing transducers 142 through 148 and the shear strain-sensing transducers 150 through 156 are preferably similar to the normal strain-sensing transducers 112 through 118 and the shear strain-sensing transducers 120 through 126, respectively, which were described above. The transducer assembly 138 is fixedly attached to flowtube 12 by wrapping it around the circumference at or near the mid-span centerline CL of the flowtube and securing it thereto by suitable means, such as an adhesive. Furthermore, the electrical connections required to make four leg active bridge circuits similar to bridge circuit 90 for both the normal strain-sensing transducers 142 through 148 and the shear strain-sensing transducers 150 through 156 can easily be incorporated onto the substrate 140 to further simplify the transducer assembly 138.

It should be recognized that, while the present invention has been described in relation to the preferred embodiments thereof, those skilled in the art may develop a wide variation of structural and operational details without departing from the principles of the invention. For example, the various elements illustrated in the different embodiments may be combined in a manner not illustrated above. Therefore, the appended claims are to be construed to cover all equivalents falling within the true scope and spirit of the invention.

I claim:

1. A Coriolis mass flowmeter which comprises:
   at least one flowtube through which a fluid to be measured is allowed to flow;
   means for vibrating the flowtube in at least one mode of vibration of the flowtube;
   the vibration of the flowtube causing a driven deflection of the flowtube, and the fluid flowing through the vibrating flowtube generating Coriolis forces which cause a Coriolis deflection of the flowtube;
   first strain-sensing means connected to the flowtube for generating a signal representative of the driven deflection of the flowtube;

second strain-sensing means connected to the flowtube for generating a signal representative of the Coriolis deflection of the flowtube; and signal processing means connected to the first and second strain-sensing means for producing an indication of the mass flow rate of the fluid from the signals generated by the strain-sensing means;

wherein the first strain-sensing means comprises at least one normal stain-sensing transducer and the second strain-sensing means comprises at least on shear strain-sensing transducer.

2. The flowmeter of claim 1, wherein the first and second strain-sensing means are located at approximately the same longitudinal position on the flowtube.

3. The flowmeter of claim 2, wherein the first and second strain-sensing means are located near the mid-span centerline of the flowtube.

4. The flowmeter of claim 3, wherein the first and second strain-sensing means are mounted on a common substrate.

5. The flowmeter of claim 1, wherein the first strain-sensing means comprises at least two normal strain-sensing transducers, and each normal strain-sensing transducer comprises two strain sensing elements.

6. The flowmeter of claim 5, wherein the strain sensing elements of the normal strain-sensing transducers are connected in a four leg active bridge circuit.

7. The flowmeter of claim 1, wherein the second strain-sensing means comprises at least two shear strain-sensing transducers, and each shear strain-sensing transducer comprises two strain sensing elements.

8. The flowmeter of claim 7, wherein the strain sensing elements of the shear strain-sensing transducers are connected in a four leg active bridge circuit.

9. The flowmeter of claim 5, wherein the second strain-sensing means comprises at least two shear strain-sensing transducers, and each shear strain-sensing transducer comprises two strain sensing elements.

10. The flowmeter of claim 9, wherein the strain sensing elements of each normal strain-sensing transducer and each shear strain-sensing transducer are mounted on a common substrate.

11. The flowmeter of claim 10, wherein the substrate is attached to the flowtube near the mid-span centerline of the flowtube.

12. The flowmeter of claim 9, wherein the strain sensing elements of each normal strain-sensing transducer are connected in a first four leg active bridge circuit.

13. The flowmeter of claim 12, wherein the strain sensing elements of each shear strain sensing transducer are connected in a second four leg active bridge circuit.

14. The flowmeter of claim 1, wherein the first strain-sensing means comprises at least four normal strain-sensing transducers and the second strain-sensing means comprises at least four shear strain-sensing transducers.

15. The flowmeter of claim 14, wherein the normal strain-sensing transducers and the shear strain-sensing transducers each comprise one strain sensing element.

16. The flowmeter of claim 15, wherein the strain sensing elements of the normal strain-sensing transducers and the shear strain-sensing transducers are mounted on a common substrate.

17. The flowmeter of claim 16, wherein the substrate is attached to the flowtube near the mid-span centerline of the flowtube.

18. The flowtube of claim 17, wherein the strain sensing elements of the normal strain-sensing transducers are connected in a first four leg active bridge circuit.

19. The flowtube of claim 17, wherein the strain sensing elements of the shear strain-sensing transducers are connected in a second four leg active bridge circuit.

20. A method for determining the mass flow rate of a fluid comprising:

(1) providing a flowtube through which the fluid is permitted to flow;

(2) vibrating the flowtube in a mode of vibration of the flowtube;

(3) the vibration of the flowtube causing a driven deflection of the flowtube, and the fluid flowing through the vibrating flowtube generating Coriolis forces which cause a Coriolis deflection of the flowtube;

(4) sensing the strain at a first longitudinal position on the flowtube resulting from the driven deflection of the flowtube;

(5) sensing the strain at the first longitudinal position on the flowtube resulting from the Coriolis deflection of the flowtube;

(6) deriving an indication of the mass flow rate of the fluid from the strains sensed in steps 4 and 5 above.

21. The method of claim 20, wherein the first longitudinal position is near the mid-span centerline of the flowtube.

* * * * *